United States Patent

Aitken

Patent Number: 5,256,604
Date of Patent: * Oct. 26, 1993

[54] LOW MELTING, DURABLE PHOSPHATE GLASSES

[75] Inventor: Bruce G. Aitken, Erwin, N.Y.

[73] Assignee: Corning Incorporated, Corning, N.Y.

[*] Notice: The portion of the term of this patent subsequent to Jun. 4, 2008 has been disclaimed.

[21] Appl. No.: 873,096

[22] Filed: Apr. 24, 1992

[51] Int. Cl.$^5$ ................................. C03C 3/17
[52] U.S. Cl. ........................ 501/45; 501/47; 501/48
[58] Field of Search .................... 501/45, 48, 47

[56] References Cited

U.S. PATENT DOCUMENTS

| | | | |
|---|---|---|---|
| 4,920,081 | 4/1990 | Beall et al. | 501/46 X |
| 4,940,677 | 7/1990 | Beall et al. | 501/45 |
| 5,021,366 | 6/1991 | Aitken | 501/48 X |
| 5,022,921 | 6/1991 | Aitken | 501/48 X |
| 5,043,369 | 8/1991 | Bahn et al. | 501/32 X |
| 5,071,795 | 12/1991 | Beall et al. | 501/45 X |
| 5,122,484 | 6/1992 | Beall et al. | 501/46 |
| 5,153,151 | 10/1992 | Aitken | 501/45 |

Primary Examiner—Karl Group
Attorney, Agent, or Firm—Clinton S. Janes, Jr.

[57] ABSTRACT

This invention is directed to the production of glasses exhibiting an annealing point between 290°–325° C., an index of refraction between 1.57–1.66, a linear coefficient of thermal expansion (25°–300° C.) between $130–160 \times 10^{-7}/°C.$, and a weight loss after exposure to boiling water for six hours no greater than 0.1% consisting essentially, expressed in terms of mole percent on the oxide basis, of

| | | | |
|---|---|---|---|
| $Li_2O$ | 0–10 | $CaO + SrO + BaO(RO)$ | 0–20 |
| $Na_2O$ | 0–10 | $ZnO$ | 26–50 |
| $Li_2O + Na_2O$ | 1–20 | $RO + ZnO$ | 26–50 |
| $K_2O$ | 0–8 | $SnO$ | 0–5 |
| $Li_2O + Na_2O + K_2O(R_2O)$ | 5–25 | $Sb_2O_3$ | 0–8 |
| $Ag_2O$ | 0–13 | $Al_2O_3$ | 0.25–5 |
| $Tl_2O$ | 0–12 | $P_2O_5$ | 30–36 |
| $Ag_2O + Tl_2O$ | 1–14 | $B_2O_3$ | 0–5 |
| $R_2O + Ag_2O + Tl_2O$ | 15–30 | $CuO$ | 0–5 |
| $CaO$ | 0–20 | $Bi_2O_3$ | 0–3 |
| $BaO$ | 0–10 | $CeO_2$ | 0–2 |
| $SrO$ | 0–10 | $PbO$ | 0–10 | with the proviso that, in the presence of SnO and/or $Bi_2O_3$, $Ag_2O$ will be essentially absent.

4 Claims, No Drawings

LOW MELTING, DURABLE PHOSPHATE GLASSES

BACKGROUND OF THE INVENTION

Glass compositions which combine good chemical durability with the capability of being formed at low temperatures, i.e., the compositions have low transition temperatures (Tg), are potentially useful for a host of applications including low temperature sealing glasses, matrices for glass-polymer alloys, and press molding optically finished lenses. To illustrate:

U.S. application Ser. No. 07/704,864, filed May 23, 1991 by George H. Beall, James E. Dickinson, Jr., and Robert M. Morena under the title ZINC PHOSPHATE LOW TEMPERATURE GLASSES and assigned to the same assignee as the present application, now U.S. Pat. No. 5,122,484 is directed with particularity to low melting, lead-free glass compositions suitable as sealing frits in television picture tube applications. Those glasses are essentially free of PbO and consist essentially, expressed in terms of weight percent on the oxide basis, of:

| | | | |
|---|---|---|---|
| $P_2O_5$ | 38–50 | $SnO_2$ | 0–10 |
| $Al_2O_3$ | 0–5 | $MoO_3$ | 0–10 |
| ZnO | 28–42 | $WO_3$ | 0–10 |
| $Li_2O$ | 0.75–5 | $MoO_3 + WO_3$ | 2–15 |
| $Na_2O$ | 2–10 | Cl | 0–8 (analyzed) |
| $K_2O$ | 2–10 | $SnO_2 + MoO_3 +$ | 2–25 |
| $Li_2O + Na_2O + K_2O$ | 5–25 | $WO_3 + Cl$ | |

U.S. Pat. No. 5,043,369 (Bahn et al.) broadly discloses the production of melt blends or alloys composed of a glass and an organic polymer. The disclosed articles comprise a melt mixture of an inorganic glass and an organic polymer, the working temperature of the glass being compatible with that of the polymer. That patent referred to U.S. Pat. No. 4,920,081 (Beall et al.) and U.S. Pat. No. 4,940,677 (Beall et al.) as describing glass compositions having working temperatures and transition temperatures suitable for use in preparing melt blends or alloys.

U.S. Pat. No. 4,920,081 recites glass compositions consisting essentially, expressed in terms of mole percent on the oxide basis, of:

| | | | |
|---|---|---|---|
| $P_2O_5$ | 44–58 | $Li_2O$ | 0–30 |
| $Al_2O_3$ | 0–7 | $Na_2O + Li_2O$ | 10–45 |
| $B_2O_3$ | 0–10 | $Cu_2O$ | 0–20 |
| $Al_2O_3 + B_2O_3$ | 4–10 | $Li_2O + Cu_2O$ | 10–30 |
| $Na_2O$ | 10–30 | | | with, optionally, up to 8% total of at least one member of the group MgO, CaO, SrO, BaO, MnO, and ZnO, up to 8% $ZrO_2$, up to 3% $SiO_2$, and up to 5% F.

U.S. Pat. No. 4,940,677 reports glass compositions consisting essentially, expressed in terms of mole percent on the oxide basis, of 10–35% $R_2O$, wherein $R_2O$ consists of at least two alkali metal oxides in the indicated proportions selected from the group 0–25% $Li_2O$, 0–25% $Na_2O$, and 0–25% $K_2O$, 23–55% ZnO, 28–40% $P_2O_5$, and up to 35% total of the following optional ingredients in the indicated proportions selected from the group 0–6% $Al_2O_3$, 0–8% $B_2O_3$, 0–8% $Al_2O_3+B_2O_3$, 0–15% $Cu_2O$, 0–5% F, 0–35% PbO, 0–35% SnO, 0–35% PbO+SnO, 0–5% $ZrO_2$, 0–4% $SiO_2$, and 0–15% MgO+CaO+SrO+BaO+MnO, consisting of 0–10% MgO, 0–10% CaO, 0–10% SrO, 0–12% BaO, and 0–10% MnO.

U.S. Pat. No. 5,021,366 (Aitken) provides glass compositions which were designed specifically for use in press molding optically finished lenses, but which are also suitable for use in preparing melt blends of glass and organic polymer. That patent records glass compositions consisting essentially, expressed in terms of mole percent on the oxide basis, of:

| | | | |
|---|---|---|---|
| $Li_2O$ | 5–10 | $Al_2O_3$ | 0–5 |
| $Na_2O$ | 5–15 | $CeO_2$ | 0–2 |
| $K_2O$ | 0–6 | $P_2O_5$ | 30–36 |
| $Li_2O + Na_2O + K_2O$ | 15–25 | SnO | 0–20 |
| ZnO | 10–33 | PbO | 0–20 |
| $CaO + SrO + BaO$ | 12–25 | $Sb_2O_3$ | 0–12 |
| CaO | 0–20 | $Bi_2O_3$ | 0–6 |
| SrO | 0–20 | $SnO + PbO +$ | 0–20 |
| BaO | 0–20 | $Sb_2O_3 + Bi_2O_3$ | |

The lenses molded from those compositions exhibited refractive indices of about 1.605 and linear coefficients of thermal expansion (25°–300° C.) between 145–170-$\times 10^{-7}$/°C.

U.S. application Ser. No. 07/696,173, filed May 6, 1991 by me under the title HIGH INDEX FLUORINE-FREE PHOSPHATE GLASSES and assigned to the same assignee as the present application, now U.S. Pat. No. 5,153,151 is likewise directed principally to glass compositions designed for use in press molding optically finished lenses, but wherein refractive indices between 1.65–1.8 can be obtained. The glasses, having compositions expressed below in terms of mole percent on the oxide basis, are also noted as being operable in preparing glass-plastic alloys.

| | | | |
|---|---|---|---|
| $P_2O_5$ | 24–36 | $Al_2O_3$ | 0–5 |
| ZnO | 0–45 | SrO | 0–20 |
| $Li_2O$ | 0–15 | BaO | 0–20 |
| $Na_2O$ | 0–20 | $CaO + SrO + BaO$ | 0–25 |
| $K_2O$ | 0–10 | $Sb_2O_3$ | 0–61 |
| $Ag_2O$ | 0–25 | $Bi_2O_3$ | 0–10 |
| $Tl_2O$ | 0–25 | $Sb_2O_3 + Bi_2O_3$ | 0–61 |
| $Li_2O + Na_2O + K_2O + Ag_2O + Tl_2O$ | 15–30 | $Sb_2O_3 + Bi_2O_3 + Ag_2O + Tl_2O$ | 7–76 |
| PbO | 0–20 | $B_2O_3$ | 0–10 |
| CuO | 0–5 | $Al_2O_3 + B_2O_3$ | 0–10 |
| CaO | 0–20 | SnO | 0–5 |
| $CeO_2$ | 0–2 | | | with the following provisos:

(1) in the absence of $Sb_2O_3$ and/or $Bi_2O_3$, the total $Ag_2O$ and $Tl_2O$ will range 11–25;

(2) in the absence of $Ag_2O$ and/or $Tl_2O$, the total $Sb_2O_3+Bi_2O_3$ will range 7–61;

(3) when present in the absence of $Bi_2O_3$ and/or $Ag_2O$ and/or $Tl_2O$, $Sb_2O_3$ will range 10–61, and, when present in the absence of $Sb_2O_3$ and/or $Ag_2O$ and/or $Tl_2O$, $Bi_2O_3$ will range 7–10;

(4) when present in the absence of $Bi_2O_3$, $Sb_2O_3$, and $Tl_2O$, $Ag_2O$ will range 13–25; and (5) when present in the absence of $Ag_2O$, $Bi_2O_3$, and $Sb_2O_3$, $Tl_2O$ will range 11–25.

The glasses exhibited annealing points between 300°–340° C., linear coefficients of thermal expansion (25°–300° C.) between 135–180$\times 10^{-7}$/°C., and weight losses after exposure to boiling water for six hours no greater than 0.33%.

Further laboratory research has led to the discovery of transparent glasses having compositions within closely-circumscribed limits which demonstrate very low annealing points, i.e., less than 325° C. with some compositions having annealing points as low as about 290° C., improved chemical durability and resistance to weathering, and indices of refraction between 1.57-1.66, which indices are compatible with certain transparent organic polymers, such as polycarbonate ($n_d=1.586$), polysulfone ($n_d=1.633$)and polyethersulfone ($n_d=1.650$), thereby recommending their utility in preparing transparent glass-plastic melt blends and composites.

SUMMARY OF THE INVENTION

The inventive glasses have compositions within the basic $R_2O-Ag_2O-Tl_2O-ZnO-P_2O_5$ system; i.e., the compositions thereof are an improvement upon the glasses disclosed in U.S. Pat. No. 4,940,677, supra, wherein $Ag_2O$ and/or $Tl_2O$ are substituted for a portion of the $R_2O$, i.e., the $Li_2O$, $Na_2O$, and $K_2O$. The $Ag_2O$ and $Tl_2O$ serve three functions relevant to the present inventive glasses; viz., they lower the annealing point of the glass, they raise the index of refraction of the glass, and they improve the chemical durability of the glass.

The inventive glasses consist essentially, expressed in terms of mole percent on the oxide basis, of

| | | | |
|---|---|---|---|
| $Li_2O$ | 0-10 | CaO + SrO + BaO(RO) | 0-20 |
| $Na_2O$ | 0-10 | ZnO | 26-50 |
| $Li_2O + Na_2O$ | 1-20 | RO + ZnO | 26-50 |
| $K_2O$ | 0-8 | SnO | 0-5 |
| $Li_2O + Na_2O + K_2O(R_2O)$ | 5-25 | $Sb_2O_3$ | 0-8 |
| $Ag_2O$ | 0-13 | $Al_2O_3$ | 0.25-5 |
| $Tl_2O$ | 0-12 | $P_2O_5$ | 30-36 |
| $Ag_2O + Tl_2O$ | 1-14 | $B_2O_3$ | 0-5 |
| $R_2O + Ag_2O + Tl_2O$ | 15-30 | CuO | 0-5 |
| CaO | 0-20 | $Bi_2O_3$ | 0-3 |
| BaO | 0-10 | $CeO_2$ | 0-2 |
| SrO | 0-10 | PbO | 0-10 | with the proviso that, in the presence of SnO and/or $Bi_2O_3$, $Ag_2O$ will be essentially absent.

The inclusion of at least 26% ZnO has been found to be essential in maintaining the annealing points of these glasses at sufficiently low levels, preferably below 300° C., in order that the glasses will be capable of being processed with the aforementioned organic polymers.

The presence of the alkaline earth oxides raises the refractive index of the glass without increasing the dispersion therein and elevating the annealing point thereof. Their presence also frequently improves the chemical durability of the glass. Nevertheless, excessive levels increase the susceptibility of the glass to devitrification.

The inclusion of lead in a glass composition is well known in the art for its effect in raising the refractive index thereof, but its presence also has the adverse effect of rendering the glass susceptible to discoloration through reduction, particularly when blended with polymers or molded with metals. Furthermore, the addition of lead sharply raises the coefficient of thermal expansion of the glass which requires compensation through addition of the alkaline earth metal oxides and/or $Sb_2O_3$ and/or SnO and/or $Al_2O_3$ and/or $B_2O_3$ Accordingly, although PbO can be tolerated in the inventive compositions, it is much preferred that levels thereof be held below 5%, if present at all.

$Al_2O$, $B_2O_3$, and SnO exert a favorable effect upon the chemical durability of the inventive glasses. Nevertheless, the amounts of $Al_2O_3$ and/or $B_2O_3$ must be held at low concentrations to forestall elevating the annealing point to unacceptable values. High levels of SnO can lead to difficulties in melting; this oxide cannot be used in conjunction with $Ag_2O$.

$Sb_2O_3$ and $Bi_2O_3$ raise the refractive index of the inventive glasses. $Sb_2O_3$ is the more preferred because it is less subject to reducing conditions and is more readily soluble in the molten base glass than $Bi_2O_3$.

$CeO_2$ may be included to render the glass resistant to such radiations as X-radiations.

Whereas it is not mathematically possible to convert composition intervals expressed in terms of mole percent to exact composition ranges expressed in terms of weight percent, the following values reflect approximations of the compositions of the inventive glasses in terms of weight percent:

| | | | |
|---|---|---|---|
| $Li_2O$ | 0-3.4 | CaO + SrO + BaO(RO) | 0-25.3 |
| $Na_2O$ | 0-10.6 | | |
| $Li_2O + Na_2O$ | 0.2-14 | ZnO | 13.5-43.3 |
| $K_2O$ | 0-8.4 | RO + ZnO | 14.0-48.4 |
| $Li_2O + Na_2O + K_2O(R_2O)$ | 1-18.8 | SnO | 0-8.3 |
| | | $Sb_2O_3$ | 0-22.2 |
| $Ag_2O$ | 0-28.1 | $Al_2O_3$ | 0.2-5.7 |
| $Tl_2O$ | 0-39.6 | $P_2O_5$ | 27.1-55.8 |
| $Ag_2O + Tl_2O$ | 1.9-39.6 | $B_2O_3$ | 0-4.0 |
| $R_2O + Ag_2O + Tl_2O$ | 6.8-48.1 | CuO | 0-4.5 |
| | | $Bi_2O_3$ | 0-14.1 |
| CaO | 0-12.8 | $CeO_2$ | 0-3.9 |
| BaO | 0-15.8 | PbO | 0-21.7 |
| SrO | 0-11.2 | | | with the proviso that, in the presence of SnO and/or $Bi_2O_3$, $Ag_2O$ will be essentially absent.

DESCRIPTION OF PREFERRED EMBODIMENTS

Table I reports a group of glass compositions melted on a laboratory scale and recited in terms of mole percent on the oxide basis illustrating the inventive glasses. Table IA records the same group of compositions expressed in terms of parts by weight on the oxide basis. Because the sum of the individual constituents listed in Table IA totals or closely approximates 100, for all practical purposes the tabulated values may be considered to represent weight percent. The actual batch ingredients can comprise any materials, either oxides or other compounds, which, when melted in combination with the other components, will be converted into the desired oxide in the proper proportions. For example, zinc orthophosphate may be employed as a source of ZnO and $P_2O_5$ and $LiPO_3$ and $NaPO_3$ can comprise the sources of $Li_2O$ and $Na_2O$, respectively.

The batch ingredients were compounded, tumble mixed together to assist in securing a homogeneous melt, and thereafter charged into platinum crucibles. After placing lids thereon, the crucibles were introduced into a furnace operating at about 1000° C. and the batches melted for about 3 hours. The melts were then poured into steel molds to form glass slabs having dimensions of about 6"×4"×0.5" (~15.2×10×1.3 cm) which were transferred immediately to an annealer operating at 300°-325° C.

(Whereas the above description reflects melting on a laboratory scale only, it must be appreciated that large scale melts thereof can be carried out in commercial melting units. Hence, it is only necessary that the batch materials be melted at a temperature and for a time sufficient to obtain a homogeneous melt.)

TABLE I (Mole Percent)

|  | 1 | 2 | 3 | 4 | 5 |
|---|---|---|---|---|---|
| $Li_2O$ | 7.0 | 3.5 | 3.5 | 7.0 | 7.0 |
| $Na_2O$ | 8.0 | 4.0 | 4.0 | 8.0 | 4.0 |
| $K_2O$ | 1.25 | 2.5 | 2.5 | — | 0.5 |
| $Ag_2O$ | — | — | — | — | 4.5 |
| $Tl_2O$ | 3.75 | 10.0 | 10.0 | 5.0 | — |
| CaO | 11.25 | — | 12.0 | 11.25 | 11.25 |
| BaO | 3.75 | — | 6.0 | 3.75 | 3.75 |
| ZnO | 28.6 | 45.0 | 26.0 | 27.0 | 29.6 |
| SnO | 1.0 | — | 1.0 | — | — |
| $Al_2O_3$ | 0.4 | 2.0 | 2.0 | 0.5 | 0.4 |
| $Bi_2O_3$ | — | — | — | 2.5 | — |
| $P_2O_5$ | 35.0 | 33.0 | 33.0 | 35.0 | 35.0 |

|  | 6 | 7 | 8 | 9 | 10 |
|---|---|---|---|---|---|
| $Li_2O$ | 2.8 | 2.8 | 7.0 | — | — |
| $Na_2O$ | 3.2 | 3.2 | 8.0 | — | — |
| $K_2O$ | 2.0 | 2.0 | 5.0 | — | — |
| $Ag_2O$ | 12.8 | 12.0 | — | 20.0 | — |
| $Tl_2O$ | — | — | — | — | 20.0 |
| CaO | — | — | 22.5 | — | — |
| ZnO | 44.6 | 45.0 | 22.5 | 45.0 | 45.0 |
| $Al_2O_3$ | 2.0 | 2.0 | — | — | — |
| $P_2O_5$ | 32.7 | 33.0 | 35.0 | 35.0 | 35.0 |

TABLE IA (Parts by Weight)

|  | 1 | 2 | 3 | 4 | 5 |
|---|---|---|---|---|---|
| $Li_2O$ | 1.9 | 0.8 | 0.8 | 1.7 | 2.0 |
| $Na_2O$ | 4.5 | 1.9 | 1.8 | 4.0 | 4.8 |
| $K_2O$ | 1.1 | 1.8 | 1.7 | — | 0.5 |
| $Ag_2O$ | — | — | — | — | 10.0 |
| $Tl_2O$ | 14.3 | 31.7 | 31.3 | 17.1 | — |
| CaO | 5.7 | — | 5.0 | 5.1 | 6.1 |
| BaO | 5.2 | — | 6.8 | 4.6 | 5.5 |
| ZnO | 21.0 | 27.4 | 15.6 | 17.7 | 23.1 |
| SnO | 1.4 | — | 1.1 | — | — |
| $Al_2O_3$ | 0.4 | 1.5 | 1.5 | 0.4 | 0.4 |
| $Bi_2O_3$ | — | — | — | 9.4 | — |
| $P_2O_5$ | 44.7 | 35.0 | 34.5 | 40.0 | 47.7 |

(Concluded)

|  | 6 | 7 | 8 | 9 | 10 |
|---|---|---|---|---|---|
| $Li_2O$ | 0.7 | 0.7 | 2.3 | — | — |
| $Na_2O$ | 1.7 | 1.7 | 5.4 | — | — |
| $K_2O$ | 1.6 | 1.6 | 5.1 | — | — |
| $Ag_2O$ | 24.9 | 23.6 | — | 35.0 | — |
| $Tl_2O$ | — | — | — | — | 49.6 |
| CaO | — | — | 13.6 | — | — |
| ZnO | 30.5 | 31.0 | 19.8 | 27.6 | 21.4 |
| $Al_2O_3$ | 1.7 | 1.7 | — | — | — |
| $P_2O_5$ | 39.0 | 39.7 | 53.7 | 37.4 | 29.0 |

Table II records the softening point (S.P.), annealing point (A.P.), and strain point (St.P.) in terms of °C., the linear coefficient of thermal expansion (Exp.) over the temperature interval of 25°–300° C. expressed in terms of $\times 10^{-7}$/°C., the refractive index ($n_{d3}$), and the density (Den.) expressed in terms of grams/ determined in accordance with measuring techniques conventional in the glass art. Table II also lists the weight loss (W.L.) exhibited by the glasses after an immersion for six hours in a bath of boiling deionized water, expressed in terms of percent, and a qualitative appraisal of the weathering resistance of the glasses (Weath.) based upon the visual appearance thereof after an exposure in a humidity cabinet for 500 hours at 60° C. and 90% relative humidity. Legends for the weathering resistance character of the glasses include: nc=no change in appearance; xl=extremely light frosted appearance; vl=very light frosted appearance; lt=light frosted appearance; l-vl=light to very light frosted appearance; and hf=heavy frosted appearance. A weight loss in excess of 0.1% is deemed to constitute unsatisfactory chemical durability, with losses less than 0.05% being greatly preferred; thus, a chemical durability considerably improved over the glasses of Ser. No. 07/696,173 supra. The most preferred glasses will display no frosting or haze. Where haze can be observed only when the glass is viewed at a small angle (exemplified by legends xl and vl), however, the glasses will perform satisfactorily in most applications.

TABLE II

|  | 1 | 2 | 3 | 4 | 5 |
|---|---|---|---|---|---|
| S.P. | 414 | 390 | 442 | 414 | 399 |
| A.P. | 308 | 297 | 338 | 311 | 302 |
| St.P. | 288 | 277 | 319 | 289 | — |
| Exp. | 153 | 147.7 | 143.6 | 151.9 | 148.1 |
| Den. | 3.498 | 4.037 | 4.045 | 3.824 | 3.409 |
| $n_d$ | 1.601 | 1.631 | 1.646 | 1.639 | 1.604 |
| W.L. | <0.01 | 0.01 | <0.01 | <0.01 | 0.01 |
| Weath. | xl | nc | nc | lt | l-vl |

(Concluded)

|  | 6 | 7 | 8 | 9 | 10 |
|---|---|---|---|---|---|
| S.P. | 374 | — | — | — | — |
| A.P. | 290 | 299 | 328 | — | — |
| St.P. | 273 | 287 | 307 | — | — |
| Exp. | 156 | 131 | 148 | — | — |
| Den. | 3.889 | 3.790 | — | — | — |
| $n_d$ | 1.634 | 1.622 | 1.564 | 1.669 | 1.687 |
| W.L. | <0.01 | 0.01 | 0.02 | >0.1 | >0.1 |
| Weath. | l-vl | nc | lt | hf | hf |

As can be observed, Examples 8–10 having compositions outside of the prescribed ranges are subject to significant weathering. The refractive index of Example 8 is also below the minimum desired; conversely, the refractive indices of Examples 9 and 10 are too high for the desired application.

Based upon an overall appraisal of the chemical and physical properties demonstrated by the inventive glasses, taken in conjunction with their melting and forming characteristics, the preferred glasses consist essentially, expressed in terms of mole percent on the oxide basis, of:

| | | | |
|---|---|---|---|
| $Li_2O$ | 2–8 | CaO + SrO + BaO(RO) | 0–15 |
| $Na_2O$ | 2–12 | ZnO | 26–46 |
| $Li_2O + Na_2O$ | 5–20 | RO + ZnO | 26–48 |
| $K_2O$ | 0–6 | SnO | 0–3 |
| $Li_2O + Na_2O + K_2O(R_2O)$ | 5–20 | $Sb_2O_3$ | 0–8 |
| $Ag_2O$ | 0–13 | $Al_2O_3$ | 0.5–3 |
| $Tl_2O$ | 0–12 | $P_2O_5$ | 30–34 |
| $Ag_2O + Tl_2O$ | 1–14 | $B_2O_3$ | 0–3 |
| $R_2O + Ag_2O + Tl_2O$ | 15–25 | CuO | 0–5 |
| CaO | 0–15 | $Bi_2O_3$ | 0–3 |
| BaO | 0–8 | $CeO_2$ | 0–2 |
| SrO | 0–8 | PbO | 0–5 | with the proviso that in the presence of SnO and/or $Bi_2O_3$, $Ag_2O$ will be essentially absent.

The composition providing the most preferred combination of properties and working behavior is Example 2. That glass not only functions well when being press molded into lenses, but also exhibits excellent forming capability when blended with organic polymers to produce glass-polymer alloys and composites, and is particularly well-suited for blending with polysulfone to make a transparent glass/polymer alloy or composite because of the closeness of their respective indices of refraction.

I claim:

1. A glass exhibiting an annealing point between 290°–325° C., an index of refraction between 1.57–1.66, a linear coefficient of thermal expansion (25°–300° C.) between $130-160 \times 10^{-7}/°C.$, and a weight loss after exposure to boiling water for six hours no greater than 0.1% consisting essentially, expressed in terms of mole percent on the oxide basis, of

| | | | |
|---|---|---|---|
| $Li_2O$ | 0–10 | $CaO + SrO + BaO(RO)$ | 0–20 |
| $Na_2O$ | 0–10 | $ZnO$ | 26–50 |
| $Li_2O + Na_2O$ | 1–20 | $RO + ZnO$ | 26–50 |
| $K_2O$ | 0–8 | $SnO$ | 0–5 |
| $Li_2O + Na_2O + K_2O(R_2O)$ | 5–25 | $Sb_2O_3$ | 0–8 |
| $Ag_2O$ | 0–13 | $Al_2O_3$ | 0.25–5 |
| $Tl_2O$ | 0–12 | $P_2O_5$ | 30–36 |
| $Ag_2O + Tl_2O$ | 1–14 | $B_2O_3$ | 0–5 |
| $R_2O + Ag_2O + Tl_2O$ | 15–30 | $CuO$ | 0–5 |
| $CaO$ | 0–20 | $Bi_2O_3$ | 0–3 |
| $BaO$ | 0–10 | $CeO_2$ | 0–2 |
| $SrO$ | 0–10 | $PbO$ | 0–10 | with the proviso that, in the presence of SnO and/or $Bi_2O_3$, $Ag_2O$ will be essentially absent.

2. A glass according to claim 1 consisting essentially of

| | | | |
|---|---|---|---|
| $Li_2O$ | 2–8 | $CaO + SrO + BaO(RO)$ | 0–15 |
| $Na_2O$ | 2–12 | $ZnO$ | 26–46 |
| $Li_2O + Na_2O$ | 5–20 | $RO + ZnO$ | 26–48 |
| $K_2O$ | 0–6 | $SnO$ | 0–3 |
| $Li_2O + Na_2O + K_2O(R_2O)$ | 5–20 | $Sb_2O_3$ | 0–8 |
| $Ag_2O$ | 0–13 | $Al_2O_3$ | 0.5–3 |
| $Tl_2O$ | 0–12 | $P_2O_5$ | 30–34 |
| $Ag_2O + Tl_2O$ | 1–14 | $B_2O_3$ | 0–3 |
| $R_2O + Ag_2O + Tl_2O$ | 15–25 | $CuO$ | 0–5 |
| $CaO$ | 0–15 | $Bi_2O_3$ | 0–3 |
| $BaO$ | 0–8 | $CeO_2$ | 0–2 |
| $SrO$ | 0–8 | $PbO$ | 0–5 | with the proviso that, in the presence of SnO and/or $Bi_2O_3$, $Ag_2O$ will be essentially absent.

3. A lens prepared from a glass exhibiting an annealing point between 290°–325° C., an index of refraction between 1.57–1.66, a linear coefficient of thermal expansion (25°–300° C.) between $130-160 \times 10^{-7}/°C.$, and a weight loss after exposure to boiling water for six hours no greater than 0.1% consisting essentially, expressed in terms of mole percent on the oxide basis, of

| | | | |
|---|---|---|---|
| $Li_2O$ | 0–10 | $CaO + SrO + BaO(RO)$ | 0–20 |
| $Na_2O$ | 0–10 | $ZnO$ | 26–50 |
| $Li_2O + Na_2O$ | 1–25 | $RO + ZnO$ | 26–50 |
| $K_2O$ | 0–8 | $SnO$ | 0–5 |
| $Li_2O + Na_2O + K_2O(R_2O)$ | 5–25 | $Sb_2O_3$ | 0–8 |
| $Ag_2O$ | 0–13 | $Al_2O_3$ | 0.25–5 |
| $Tl_2O$ | 0–12 | $P_2O_5$ | 30–36 |
| $Ag_2O + Tl_2O$ | 1–14 | $B_2O_3$ | 0–5 |
| $R_2O + Ag_2O + Tl_2O$ | 15–30 | $CuO$ | 0–5 |
| $CaO$ | 0–20 | $Bi_2O_3$ | 0–3 |
| $BaO$ | 0–10 | $CeO_2$ | 0–2 |
| $SrO$ | 0–10 | $PbO$ | 0–10 | with the proviso that, in the presence of SnO and/or $Bi_2O_3$, $Ag_2O$ will be essentially absent.

4. A lens according to claim 3 prepared from a glass having a composition consisting essentially of

| | | | |
|---|---|---|---|
| $Li_2O$ | 2–8 | $CaO + SrO + BaO(RO)$ | 0–15 |
| $Na_2O$ | 2–12 | $ZnO$ | 26–46 |
| $Li_2O + Na_2O$ | 5–20 | $RO + ZnO$ | 26–48 |
| $K_2O$ | 0–6 | $SnO$ | 0–3 |
| $Li_2O + Na_2O + K_2O(R_2O)$ | 5–20 | $Sb_2O_3$ | 0–8 |
| $Ag_2O$ | 0–13 | $Al_2O_3$ | 0.5–3 |
| $Tl_2O$ | 0–12 | $P_2O_5$ | 30–34 |
| $Ag_2O + Tl_2O$ | 1–14 | $B_2O_3$ | 0–3 |
| $R_2O + Ag_2O + Tl_2O$ | 15–25 | $CuO$ | 0–5 |
| $CaO$ | 0–15 | $Bi_2O_3$ | 0–3 |
| $BaO$ | 0–8 | $CeO_2$ | 0–2 |
| $SrO$ | 0–8 | $PbO$ | 0–5 | with the proviso that, in the presence of SnO and/or $Bi_2O_3$, $Ag_2O$ will be essentially absent.

* * * * *